United States Patent [19]

Maggi

[11] 4,091,452
[45] May 23, 1978

[54] CVSD DIGITAL ADDER

[75] Inventor: Charles Robert Maggi, Morris Plains, N.J.

[73] Assignee: International Telephone and Telegraph Corporation, Nutley, N.J.

[21] Appl. No.: 734,854

[22] Filed: Oct. 22, 1976

[51] Int. Cl.² .............................................. G06F 7/50
[52] U.S. Cl. .................................................. 364/768
[58] Field of Search .............. 235/176, 168; 325/38 B; 328/159

[56] References Cited

U.S. PATENT DOCUMENTS

| 3,675,000 | 7/1972 | Lincoln et al. | 235/168 |
| 3,764,792 | 10/1973 | Jacquart | 235/168 |
| 3,793,513 | 2/1974 | Kaneko | 325/38 B X |

*Primary Examiner*—David H. Malzahn
*Attorney, Agent, or Firm*—John T. O'Halloran; Alfred C. Hill

[57] ABSTRACT

A first plurality of D-type flip flops are connected in cascade to store successively a plurality of different adjacent CVSD bits of a first of two CVSD bit streams. A second plurality of D-type flip flops store successively a plurality of different adjacent CVSD bits of a second of two CVSD bit streams. Each of the plurality of bits of the two bit streams are capable of having a plurality of different CVSD bit combinations. Logic circuitry is coupled to the first and second plurality of D-type flip flops to simultaneously assign a different slope number to each of the plurality of different combinations of the two CVSD bit streams and to add the slope numbers of the two CVSD bit streams to provide a sum CVSD bit stream at the output of the adder.

12 Claims, 5 Drawing Figures

Fig. 1

| ONE BEFORE PREVIOUS BIT (t − 2) | PREVIOUS BIT (t −1) | PRESENT BIT t | ASSIGNED SLOPE NUMBER |
|---|---|---|---|
| 0 | 0 | 0 | −2 |
| 0 | 0 | 1 | 0 |
| 0 | 1 | 0 | 0 |
| 0 | 1 | 1 | +1 |
| 1 | 0 | 0 | −1 |
| 1 | 0 | 1 | 0 |
| 1 | 1 | 0 | 0 |
| 1 | 1 | 1 | +2 |

Fig. 2

| SIGNAL A ASSIGNED SLOPE NUMBER | + | SIGNAL B ASSIGNED SLOPE NUMBER | = | SUM | |
|---|---|---|---|---|---|
| 0 | + | −2 | = | −2 | − |
| 0 | + | −1 | = | −1 | |
| 0 | + | 0 | = | 0 | T |
| 0 | + | +1 | = | +1 | |
| 0 | + | +2 | = | +2 | + |
| −2 | + | −2 | = | −4 | − |
| −2 | + | −1 | = | −3 | |
| −2 | + | 0 | = | −2 | |
| −2 | + | +1 | = | −1 | |
| −2 | + | +2 | = | 0 | T |
| −1 | + | −2 | = | −3 | − |
| −1 | + | −1 | = | −2 | |
| −1 | + | 0 | = | −1 | |
| −1 | + | +1 | = | 0 | T |
| −1 | + | +2 | = | +1 | + |
| +1 | + | −2 | = | −1 | − |
| +1 | + | −1 | = | 0 | T |
| +1 | + | 0 | = | +1 | |
| +1 | + | +1 | = | +2 | + |
| +1 | + | +2 | = | +3 | |
| +2 | + | −2 | = | 0 | T |
| +2 | + | −1 | = | +1 | |
| +2 | + | 0 | = | +2 | + |
| +2 | + | +1 | = | +3 | |
| +2 | + | +2 | = | +4 | |

T = TOGGLE OUTPUT

Fig. 3

SIGNAL A

| | ASSIGNED SLOPE NUMBER | −2 | −1 | 0 | +1 | +2 |
|---|---|---|---|---|---|---|
| SIGNAL B | −2 | 0 | 0 | 0 | 0 | T |
| | −1 | 0 | 0 | 0 | T | 1 |
| | 0 | 0 | 0 | T | 1 | 1 |
| | +1 | 0 | T | 1 | 1 | 1 |
| | +2 | T | 1 | 1 | 1 | 1 |

(ALGORITHM TABLE)

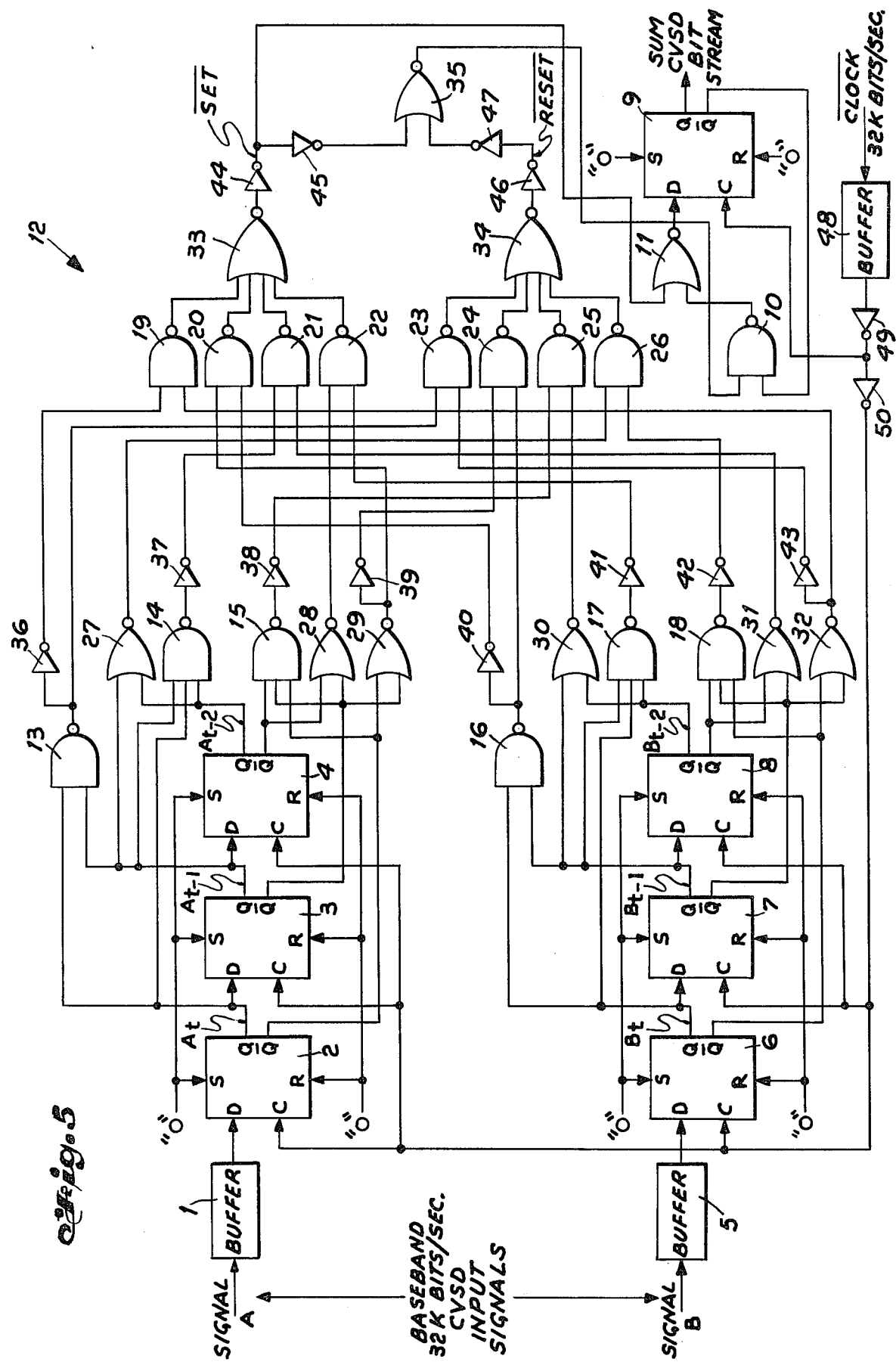

CVSD DIGITAL ADDER

BACKGROUND OF THE INVENTION

This invention relates to digital adders and more particularly to a continuously variable slope delta modulation (CVSD) digital adder.

In the past to add two CVSD bit streams it was necessary to convert the two CVSD bit streams to two binary bit streams, add the resultant two binary bit streams to obtain a sum binary bit stream and to convert the sum binary bit stream to a sum CVSD bit stream.

SUMMARY OF THE INVENTION

An object of the present invention is to provide a CVSD digital adder wherein two CVSD bit streams are directly added one to the other to provide a sum CVSD bit stream.

Another object of the present invention is to provide a CVSD digital adder which does not require the translation of the two CVSD bit streams to be added to two binary bit streams for addition thereof and then retranslating the resultant sum binary bit stream to a CVSD sum bit stream.

A feature of the present invention is the provision of a CVSD digital adder comprising: first means to separately store in succession a plurality of different adjacent CVSD bits of at least two CVSD bit streams, each of the plurality of bits being capable of having a plurality of different CVSD bit combinations; and second means coupled to the first means to simultaneously assign a different slope number to each of the plurality of different combinations of the two CVSD bit streams and to add the slope numbers of the two CVSD bit streams to provide a sum CVSD bit stream at an output of the adder.

Another feature of the present invention is the provision of a method of digitally adding at least two CVSD bit streams comprising the steps of: assigning a different slope number to each of a plurality of different CVSD bit combinations of each of the two CVSD bit streams; and adding the slope numbers of each of the two CVSD bit streams to provide a sum CVSD bit stream.

BRIEF DESCRIPTION OF THE DRAWING

Above-mentioned and other features and objects of this invention will become more apparent by reference to the following description taken in conjunction with the accompanying drawing, in which:

FIGS. 1, 2 and 3 are diagrams useful in explaining the operation of the CVSD digital adder in accordance with the principles of the present invention;

FIG. 5 is a logic diagram of the CVSD digital adder in accordance with the principles of the present invention.

DESCRIPTION OF THE PREFERRED EMBODIMENT

Figure 4:
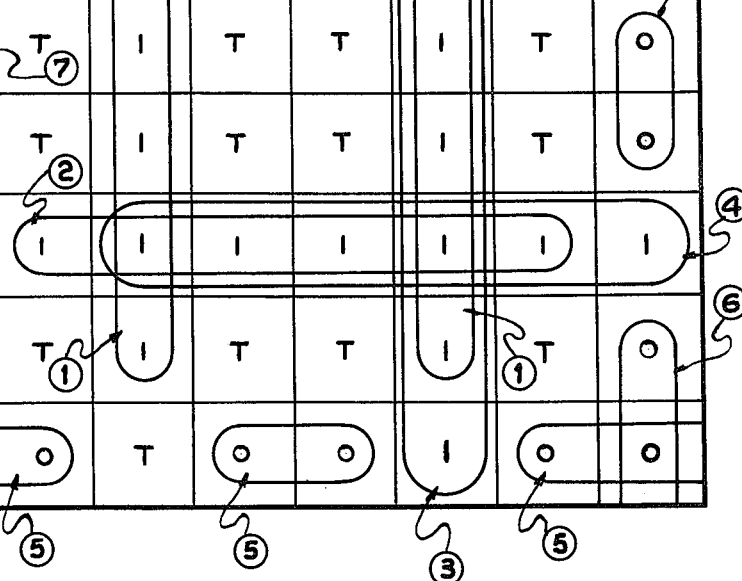
FIG. 4 is a algorithm table for the CVSD digital adder in accordance with the principles of the present invention.

In the past it has been a misconception that absolute instantaneous amplitude of an analog signal, the changes of which are represented by a CVSD bit must be known. The bits of a CVSD bit stream contains therein slope information of the analog signal that tells the relative position in relation to the previous bit. Therefore, this slope information may be added in accordance with the algorithm of the present invention to obtain the CVSD summation signal using totally digital circuitry.

Referring to FIG. 1, there is illustrated therein a table of the present bit $t$, the previous bit $(t-1)$ and the one before the previous bit $(t-2)$. It will be noted that this table of FIG. 1 illustrates eight different CVSD bit combinations. In accordance with the principles of the present invention, each of the different CVSD bit combinations is assigned a slope number which is shown in the fourth column of FIG. 1. The slope numbers are empirically assigned for this three bit algorithm, however, there would be more values if more previous bits were required to obtain better resolution. However, it has been found that the present and two previous adjacent bits provide sufficient resolution to enable the addition of two CVSD bit streams.

Referring to FIG. 2, there is illustrated therein two signals (signal A and signal B) with their various assigned slope numbers. By merely adding the assigned slope numbers of signal A and signal B there results the sum bit as illustrated in the last column of FIG. 2. The T is employed to designate a toggle output which will cause the output of the digital adder to change its state each time a T is present which indicates that the sum of the assigned slope number of signal A and signal B is zero. Again, as before, the absolute instantaneous amplitude of the analog signal, the change of which is represented by each bit is irrelevant, the important thing is how fast the amplitude of each bit is changing. As illustrated in FIG. 2, there has been defined a set of five possible input slope numbers for the two signals A and B resulting in nine possible output slope numbers including the T output. The eight output slope numbers are shown in blocks in FIG. 2 and the T output is shown opposite the sum zero. It is possible that this arrangement does not yield enough resolution, but when it is considered that we are operating on one bit, changes in slopes from one bit to the next bit will yield a great variation at the CVSD decoder on the time constants and filter lag. It is contended that all variations in output slopes will be a function of making the illustrated bit-by-bit slope comparisons on the input slope numbers.

Referring to FIG. 3, there is illustrated therein a table showing the results of adding the slope numbers of signal A to the slope numbers of signal B. When the resultant sum is a negative sum, the sum CVSD bit is forced to a logic "0" and when the resultant sum is a positive sum, the sum CVSD bit is forced to a logic "1". If the sum of the assigned slope numbers of the two signals A and B is zero, a toggle output T results.

Referring to FIG. 4, there is illustrated therein an algorithm table for the addition of signals A and B. From this algorithm table the following logic equations can be set forth for a set (logic "1") sum output and a reset (logic "0") sum output. If the set and reset logic equations are not met, there is provided a toggle T output. The following are the set and reset logic equations:

| | LINE # |
|---|---|
| Set = $(A_{t-1} \cdot A_t)(B_{t-1} + B_t)$ | 1 |
| $+ (B_{t-1} \cdot B_t)(A_{t-1} + A_t)$ | 2 |
| $+ (A_{t-2} \cdot A_{t-1} \cdot A_t)(B_{t-2} + B_{t-1})$ | 3 |
| $+ (B_{t-2} \cdot B_{t-1} \cdot B_t)(A_{t-2} + A_{t-1})$ | 4 |
| ReSet = $\overline{(A_{t-1} \cdot A_t)} \cdot \overline{(B_{t-1} + B_t)}$ | 5 |
| $+ \overline{(B_{t-1} \cdot B_t)} \cdot \overline{(A_{t-1} + A_t)}$ | 6 |

-continued

| | LINE # |
|---|---|
| $+ \overline{(\overline{A_{t-2}} \cdot \overline{A_{t-1}} \cdot \overline{A_t}) \cdot (\overline{B_{t-2}} + \overline{B_{t-1}})}$ | 7 |
| $+ \overline{(\overline{B_{t-2}} \cdot \overline{B_{t-1}} \cdot \overline{B_t}) \cdot (\overline{A_{t-2}} + \overline{A_{t-1}})}$ | 8 |

The previous line #'s illustrate the correlation between the set logic equation and reset logic equation, respectively, and the circled line #'s of the algorithm table of FIG. 4 thereby providing a correlation between the set and reset equations and the algorithm table to show the resultant sum CVSD bit stream at the output of the adder.

Referring to FIG. 5, there is illustrated the logic diagram to carry out the algorithm of FIG. 4. Signal A is coupled to a buffer 1 whose output is coupled to three cascade connected D-type flip flops 2-4 to store the present bit $A_t$, the previous bit $A_{t-1}$ and the one before the previous bit $A_{t-2}$. The signal B is coupled through buffer 5 to three cascade connected D-type flip-flops 6-8 to store the present bit $B_t$, the previous bit $B_{t-1}$ and the one before the previous bit $B_{t-2}$.

The sum CVSD bit stream is obtained at the Q output of D-type flip-flop 9. When a toggle T appears in the algorithm table of FIG. 4, where toggle T is always a logic "0", the connection between the $\overline{Q}$ output of flip flop 9 and NAND gate 10 and NOR gate 11 causes the Q output of flip flop 9 to change its state. Logic circuitry 12 including NAND gates 10, 13-26, NOR gates 11, 27-35 and NOT gates 36-47 cooperate to carry out the algorithm of FIG. 4 and produce the set and reset logic equations to provide the desired sum CVSD bit stream at the Q output of flip flop 9.

The flip flops 2-4 and 6-9 are controlled by a $\overline{CLOCK}$ signal coupled through buffer 48 and, hence, to NOT gate 49 to provide a CLOCK signal to control flip flop 9 and a NOT gate 50 to provide a $\overline{CLOCK}$ for controlling flip flops 2-4 and 6-8. The CLOCK and $\overline{CLOCK}$ signals trigger the flip flops 2-4 and 6-9 so that the logic value at the D input of these flip flops are entered into these flip flops for storage purposes in flip-flops 2-4 and 6-8 and to provide the sum CVSD bit stream output of flip flop 9.

If the set logic equation is satisfied, a logic "1" will be clocked out of flip-flop 9 when the CLOCK signal is applied to the C input of flip flop 9. When the reset logic equation is satisfied, a logic "0" will be clocked to the Q output of flip flop 9 when the CLOCK signal is present at the input C of flip flop 9.

While I have described above the principles of my invention in connection with specific apparatus it is to be clearly understood that this description is made only by way of example and not as a limitation to the scope of my invention as set forth in the objects thereof and in the accompanying claims.

I claim:

1. A continuously variable slope delta modulation (CVSD) digital adder comprising:
 first means to separately store in succession a plurality of different adjacent CVSD bits of at least two CVSD bit streams, each of said plurality of bits being capable of having a plurality of different CVSD bit combinations;
 second means coupled to said first means to generate a first sum output digital signal and a second sum output digital signal different than said first signal; and
 third means coupled to said second means responsive to said first and second sum output digital signals to provide a sum CVSD bit stream at an output of said adder.

2. An adder according to claim 1, wherein
 said third means includes
  an output flip flop to provide said sum CVSD bit stream, and
 said second means includes
  logic circuitry coupled between said first means and said output flip flop generate said first sum output digital signal and said second sum output digital signal.

3. An adder according to claim 1, wherein
 said first means includes
  a first plurality of cascade connected flip flops to store the present CVSD bit and a plurality of adjacent previous CVSD bits of one of said two CVSD bit streams, and
  a second plurality of cascade connected flip flops to store the present CVSD bit and a plurality of adjacent previous CVSD bits of the other of said two CVSD bit streams.

4. An adder according to claim 3, wherein
 said third means includes
  an output flip flop to provide said sum CVSD bit stream, and
 said second means includes
  logic circuitry coupled between said first and second plurality of flip flops and said output flip flop to generate said first sum output digital signal and said second sum output digital signal.

5. An adder according to claim 4, wherein said output flip flop is a D-type flip flop.

6. An adder according to claim 3, wherein
 said first plurality of flip flops are three in number to store the present CVSD bit, the adjacent previous CVSD bit and the adjacent CVSd bit before said previous CVSD bit of one of said two CVSD bit streams, and
 said second plurality of flip flops are three in number to store the present CVSD bit, the adjacent previous CVSD bit and the adjacent CVSD bit before said previous CVSD bit of the other of said two CVSD bit streams.

7. An adder according to claim 6, wherein
 said third means includes
  an output flip flop to provide said sum CVSD bit stream, and
 said second means includes
  logic circuitry coupled between said first and second plurality of flip flops and said output flip flop to generate said first sum output digital signal and said second sum output digital signal.

8. An adder according to claim 7, wherein said output flip flop is a D-type flip flop.

9. An adder according to claim 3, wherein
 said first and second plurality of flip flops are each D-type flip flops.

10. An adder according to claim 9, wherein
 said first plurality of flip flops are three in number to store the present CVSD bit, the adjacent previous CVSD bit and the adjacent CVSD bit before said previous CVSD bit of one of said two CVSD bit streams, and said second plurality of flip flops are three in number to store the present CVSD bit, the adjacent previous CVSD bit and the adjacent CVSD bit before said previous CVSD bit of the other of said two CVSD bit streams.

11. An adder according to claim 10, wherein said third means includes an output flip flop to provide said sum CVSD bit stream, and said second means includes logic circuitry coupled between said first and second plurality of flip flops and said output flip flop to generate said first sum output digital signal and said second sum output digital signal.

12. An adder according to claim 11, wherein said output flip flop is a D-type flip flop.

* * * * *